US008661351B2

(12) United States Patent
DeLuca et al.

(10) Patent No.: US 8,661,351 B2
(45) Date of Patent: Feb. 25, 2014

(54) SYSTEM, METHOD, AND APPARATUS FOR INLINE COMMENTS WITHIN ELECTRONIC COMMUNICATIONS

(75) Inventors: Lisa Seacat DeLuca, San Francisco, CA (US); Angela Richards Jones, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 12/502,025

(22) Filed: Jul. 13, 2009

(65) Prior Publication Data

US 2011/0010665 A1   Jan. 13, 2011

(51) Int. Cl.
*G06F 3/00* (2006.01)
(52) U.S. Cl.
USPC .......................... 715/751; 715/752; 715/753
(58) Field of Classification Search
USPC .................. 715/751, 810, 753, 758, 859, 861
See application file for complete search history.

(56) References Cited

U.S. PATENT DOCUMENTS

| 7,039,677 | B2 * | 5/2006 | Fitzpatrick et al. | 715/751 |
| 2006/0294189 | A1 * | 12/2006 | Natarajan et al. | 709/206 |
| 2007/0271340 | A1 * | 11/2007 | Goodman et al. | 709/206 |
| 2010/0138756 | A1 * | 6/2010 | Saund et al. | 715/758 |

* cited by examiner

*Primary Examiner* — Weilun Lo
*Assistant Examiner* — Truc Chuong
(74) *Attorney, Agent, or Firm* — Jeffrey T. Holman

(57) ABSTRACT

A communication apparatus which facilitates inline comments includes a client processing unit and an electronic memory device. The client processing unit receives an electronic communication and generates a reply communication for response to the electronic communication in an inline comment mode. The reply communication includes a copy of original content from the electronic communication. The electronic memory device is coupled to the client processing unit. The electronic memory device stores a plurality of inline comment rules. The inline comment rules facilitate adjoining comment content to the copy of original content within the reply communication according to user commands. The comment content is uniquely identified from standard response content according to the inline comment rules in effect during the inline comment mode.

13 Claims, 6 Drawing Sheets

COMMENT PREFERENCES

☒ Use source identifiers
<name>...</name> ▽

☒ Use subject line identifier
RE Inline: ▽

☒ Preserve formatting of original email content

☒ Remove signature block from reply communication

User-Defined Rules
Use Default Style #1 if no style conflict
Use Default Style #2 if style conflict
Always use Custom Style #1 for Angie Jones

[ADD] [REMOVE] [EDIT]

Comment Styles
Custom Style #1 ▽

Font: Arial ▽
Size: 14 ▽    Underline: (none) ▽
Style: Bold ▽   Effects: (none) ▽
Color: Red ▽

[ADD] [REMOVE] [EDIT]

SYSTEM, METHOD, AND APPARATUS FOR INLINE COMMENTS WITHIN ELECTRONIC COMMUNICATIONS

BACKGROUND

Electronic mail, or email, is a very convenient and popular form of communication. Email allows multiple individuals to conduct an asynchronous discussion. The discussion is asynchronous because different people can read and respond to previous emails whenever they want. Thus, asynchronous communications contrast with synchronous communications, for example, that take place over the telephone in real time.

One advantage of email is that there can be a written record of the communication thread, which is the sequence of communications that take place. As an example, an email thread can have a copy of the most recent communication, followed by the next most recent communication, and then the next most recent communication, and so on. This type of record in reverse chronological order can be useful to understand how a conversation might have progressed over time.

One difficulty with asynchronous communications, however, is that it can be difficult to correlate comments or provide answers to specific questions from a previous communication. Often, email users embed new comments within previous text so that the new comments can be readily correlated to the previous text. As one example of this technique, a user may generate a reply communication, copy the original text, scroll through the original text to a location where they intend to comment or respond, and type the comment or response. Also, in order to make the text stand out from the original text, the user may select individual instances of the new text and change the text style at each location. This process can be tedious, especially, when the text style requires multiple changes or when there are multiple locations of new text. A user also may add a note at the top of the reply communication to indicate that they have embedded comments in the original text. For example, the user might type "See my comments below" at the top of the reply communication. Also, the user may want to delete certain signatures blocks or other standard content that is automatically inserted into each email message. So, while the process of embedding comments into the original text is typically intended to be quicker and easier to understand, the conventional process is tedious and in some cases may take more time than simply responding with comments or responses that are not embedded inline with the original text.

SUMMARY

Embodiments of a computer program product are described. In one embodiment, the computer program product includes a computer useable storage medium to store a computer readable program for implementing inline comments. The computer readable program, when executed on a computer, causes the computer to perform operations. The operations include recognizing a user selection to respond to an electronic communication in an inline comment mode. The operations also include generating a reply communication with a copy of original content from the electronic communication. The operations also include adjoining comment content to the copy of original content within the reply communication according to user commands. The comment content is uniquely identified from standard response content according to inline comment rules in effect during the inline comment mode. Other embodiments of the computer program product are also described.

Embodiments of a communication apparatus are also described. In one embodiment, the communication apparatus facilitates inline comments. The communication apparatus includes a client processing unit and an electronic memory device. The client processing unit receives an electronic communication and generates a reply communication for response to the electronic communication in an inline comment mode. The reply communication includes a copy of original content from the electronic communication. The electronic memory device is coupled to the client processing unit. The electronic memory device stores a plurality of inline comment rules. The inline comment rules facilitate adjoining comment content to the copy of original content within the reply communication according to user commands. The comment content is uniquely identified from standard response content according to the inline comment rules in effect during the inline comment mode. Other embodiments of the communication apparatus are also described.

Embodiments of a method are also described. In one embodiment, the method is a method for generating a reply communication with inline comments. The method includes receiving an electronic communication on an electronic communication device. The method also includes recognizing a user selection to respond to the electronic communication in an inline comment mode. The method also includes generating a reply communication with a copy of original content from the electronic communication. The method also includes adjoining comment content to the copy of original content within the reply communication according to inline comment rules stored on the electronic communication device. The comment content is uniquely identified from standard response content according to the inline comment rules in effect during the inline comment mode. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 5 depicts a schematic diagram of one embodiment of a comment preferences interface for setting global preferences and comment style definitions.

Throughout the description, similar reference numbers may be used to identify similar elements.

DETAILED DESCRIPTION

Figure 1:
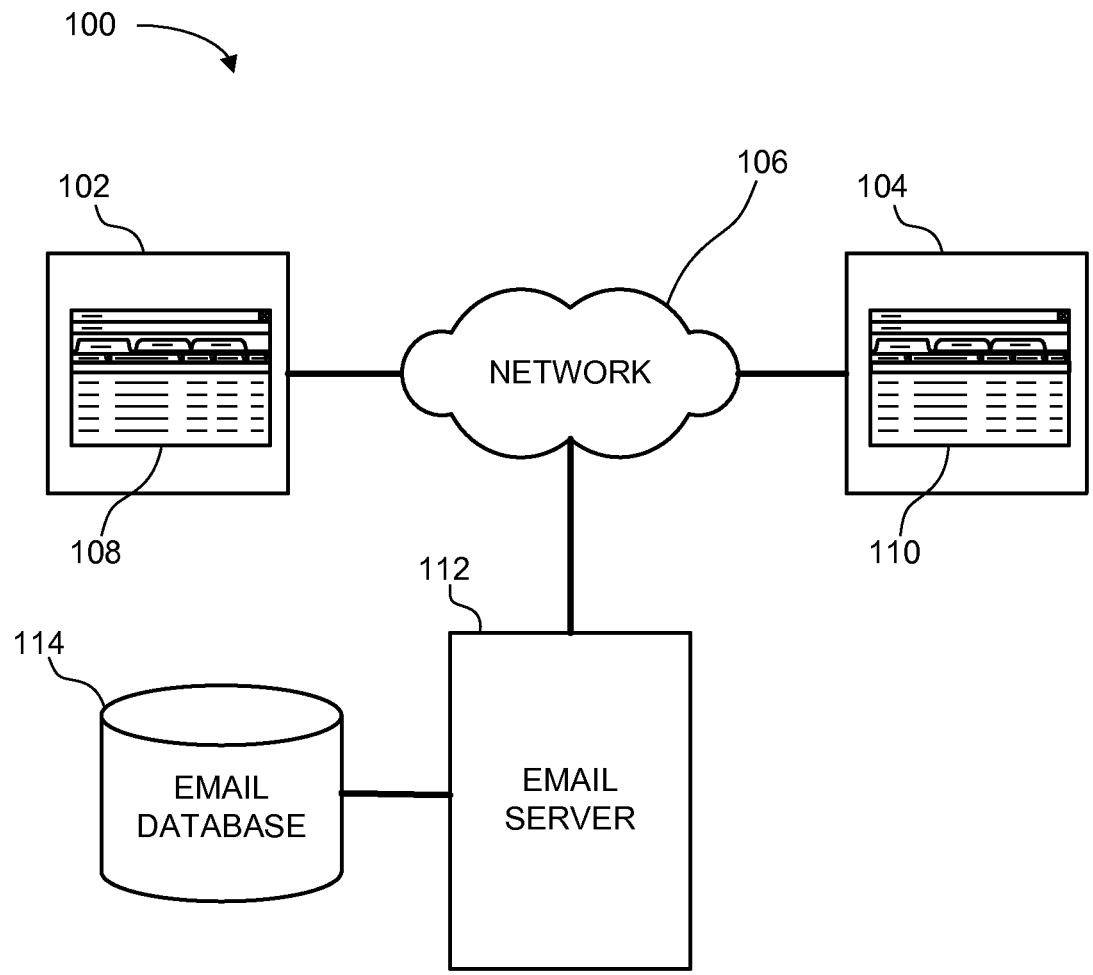
FIG. 1 depicts a schematic block diagram of one embodiment of an email system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate an improved method for providing inline comments within a reply communication. In particular, at least some of the described embodiments provide a method to enhance current email application to allow an inline response in which user preferences for text color and weight (or other text properties) are automatically entered as the user responds to an email message. This allows the user to enter the text directly, without worrying about altering the original content or repeatedly changing the text properties for each comment that is entered.

For convenience, the communications referenced herein generally relate to email communications. However, embodiments of the inline commenting functionality may be implemented with other types of asynchronous communications that can provide a visual record of the communications.

FIG. 1 depicts a schematic block diagram of one embodiment of an email system 100. Although the email system 100 is shown and described with certain components and functionality, other embodiments of the email system 100 may include fewer or more components to implement less or more functionality.

The illustrated email system 100 includes multiple nodes 102 and 104 connected together via a computer communication network 106. The network 106 may be an intranet, the internet, a local area network (LAN), a wide area network (WAN), a cellular network, or another type of network, or a combination of different types of networks.

The nodes 102 and 104 are also referred to, in some instances, as client computers 102 and 104. Each of the nodes 102 and 104 may be referred to as a sending node and/or a receiving node, depending on the direction of data flow between the nodes 102 and 104 at any given time. It should also be noted that the email system 100 may include more than two nodes.

Figure 2:
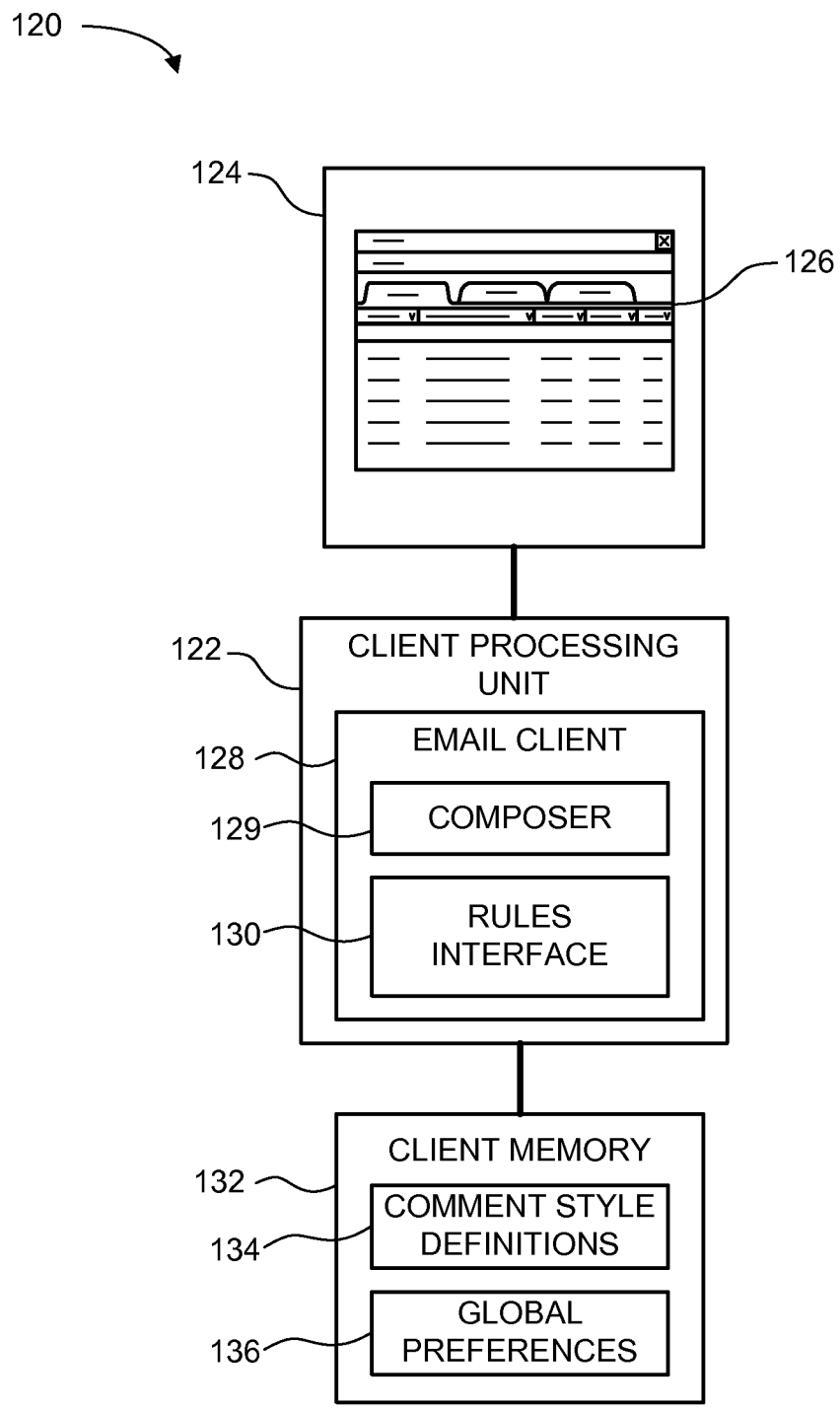
FIG. 2 depicts a schematic block diagram of one embodiment of a client computer for use in the email system of FIG. 1.

Each node 102 and 104 implements an email client 108 and 110 (represented by the depicted email user interfaces) so that an email session may be realized between the email clients 108 and 110. One example of an email client is shown in FIG. 2 and described in more detail below. Although the depicted nodes 102 and 104 include the email clients 108 and 110, respectively, other embodiments of the nodes 102 and 104 may include fewer or more clients. Additionally, at least some of the resources of each client may be shared among multiple clients. For example, some embodiments of the nodes 102 and 104 store email messages and related messages and data on a single data repository (e.g., email database 114). As another example, the email messages and related messages and data of the nodes 102 and 104 may be stored on more than one data repository. The data repositories may be locally or remotely located relative to one or both email clients 108 and 110. Other configurations also may be implemented.

The illustrated email system 100 also includes an email server 112. In some embodiments, the email server 112 facilitates an email session between the email clients 108 and 110 on the various nodes 102 and 104. Additionally, where more than two nodes and email clients are present within the email system 100, the email server 112 may facilitate a single email session among more than two nodes, or multiple email sessions between the same or different nodes within the email system 100. It should be noted that the configurations of the nodes 102 and 104, the email clients 108 and 110, the email server 112, the email database 114 are not limited to particular hardware or software implementations. For example, multiple email servers 112 may be present within the email system 100 to facilitate multiple simultaneous email sessions.

Additionally, the email system 100 depicts an email database 114 connected to the email server 112. The email database 114 stores emails and facilitates exchanging emails among a plurality of nodes 102 and 104 across the network 106. In one embodiment, the email database 114 facilitates local replication. In some embodiments, the email database 114 includes a local electronic memory device or a data storage device within a computer system. In one embodiment, the email database 114 includes an electronic memory device or a data storage device within the email server 112.

Although the illustrated email system 100 includes a separate email server 112 and email database 114, some embodiments of the email system 100 may function without a separate email server 112 and email database 114. As one example, the functionality otherwise implemented by the email server 112 and email database 114 may be adequately implemented by the email clients 108 and 110 on the individual nodes 102 and 104.

FIG. 2 depicts a schematic block diagram of one embodiment of a client computer 120 for use in the email system 100 of FIG. 1. The client computer 120 may be substantially similar to the nodes 102 and 104 of the email system 100.

The illustrated client computer 120 includes a client processing unit 122 and a display device 124. The display device 124 may be any type of graphical display such as a cathode ray tube (CRT) monitor, a liquid crystal display (LCD) monitor, or another type of display device. In some embodiments, the display device 124 displays an email user interface 126 that is implemented via an email client 128 which runs on the client processing unit 122. In general, the email client 128 facilitates an email session on the client computer 120. In some embodiments, the email client 128 via the email user interface 126 allows a user to read an incoming email, compose an email message for transmission to another user, and to configure options related to the functions of the email client 128.

In one embodiment, the email client 128 includes a composer 129 which allows a user to view messages received from other users and compose new messages to be sent to other users. The email client 128 also includes a rules interface 130 which allows the email client 128 to interface with a client memory 132. The client memory 132 is coupled to the client processing unit 122 and the email client 128 and, in some embodiments, may be implemented as part of the client processing unit 122. As described above, the email server 112 facilitates several email sessions between the local and remote email clients. In some embodiments, the client memory 132 stores data related to an email session of the email client 128. In some embodiments, the local email client 128 is configured to aggregate both local and remote email data from the email server 112. In this way, a user may view an email session on the display device 124 using the locally stored emails on the client memory 132 even when the client computer 120 is offline (i.e., not connected to the network 106 and/or the email server 112).

The illustrated client memory 132 also stores comment style definitions 134 and global preferences 136. In specific embodiments, these comment style definitions 134 and global preferences 136 relate to functionality which allows a user to invoke an inline commenting mode for reply communications. Specific examples of the comment style definitions 134 and global preferences 136 are provided below with reference to the description of FIGS. 3-5.

Figure 3:
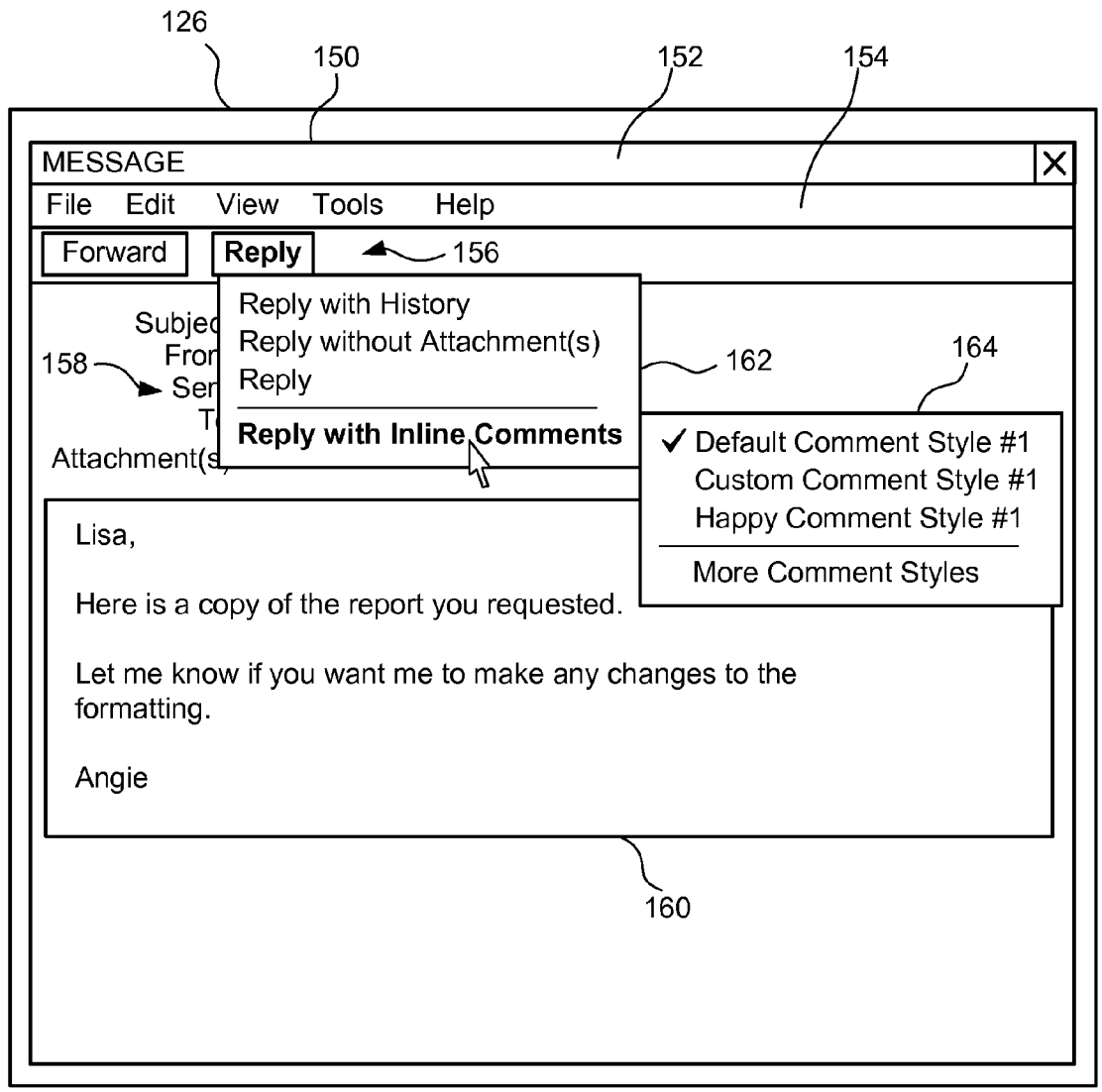
FIG. 3 depicts a schematic diagram of one embodiment of the email user interface of the client computer shown in FIG. 2.

FIG. 3 depicts a schematic diagram of one embodiment of the email user interface 126 of the client computer 120 shown in FIG. 2. The illustrated email user interface 126 displays a message 150 received from another user. The message 150 includes a title bar 152, a menu bar 154, and one or more action buttons 156. The title bar 152 shows a title of the received message 150. The menu bar 154 shows possible menu selections within the received message 150. The action buttons 156 allow the user to forward the email message 150 to another user or reply to the original sender of the message 150. The message 150 also includes standard message header information 158 and message content 160.

In one embodiment, selection of the reply action button opens up a reply option menu 162. An example of the reply option menu 162 is illustrated to include several different reply options, although other embodiments may include fewer or more reply options. The "Reply with History" option allows a user to include a copy of the original content in a reply communication. The "Reply without Attachment(s)" option allows a user to reply without attaching original attachment files to the reply communication. The "Reply" option allows a user to reply with other predetermined preferences for the reply communication.

As a new option made possible by embodiments described herein, the reply option menu 162 also includes a "Reply with Inline Comments" option. In one embodiment, the "Reply with Inline Comments" option allows a user to invoke an inline comment mode. In general, the inline comment mode automatically configures certain aspects of the reply communication so that it is convenient to embed reply comments into a copy of the original message content 160 of the received message 150. Embodiments of the inline comment mode also automatically configure specific text styles for the response comments so that the response comments are visually distinguishable from the original message content 160, as well as standard response content of the reply communication.

In one embodiment, selection of the "Reply with Inline Comments" option of the reply option menu 162 opens up a comment style menu 164 that allows a user to select a specific comment style for the inline comments. In the absence of a comment style selection by the user, a default comment style (e.g., Default Comment Style #1) may be used. Otherwise, a user may select a custom comment style (e.g., Custom Comment Style #1) that is defined by the user. Additionally, some embodiments may allow a user to select a comment style that is correlated to a specific mood (e.g., Happy Comment Style #1). Further details regarding the comment style definitions 134 are provided below with reference to the description of FIG. 5.

Each comment style specifies one or more comment text properties, which indicate visual properties applied to the comment content. For example, a comment style may define a text style with a specific font, font style, font size, and/or font color. Additionally, the comment style may define further visual characteristics such as animation, underlining, and so forth for text and/or non-text comment content.

For non-text comment content (e.g., embedded multimedia objects), the comment style also may define ways to visually distinguish the non-text comment content from the original message content 160 and/or standard response content. For example, a comment style may indicate that all non-text comment content is highlighted with a unique color. As another example, a comment style may indicate that a specific type of non-text comment content is shown with a colored border. Other embodiments may use other visual indications to identify text or non-text comment content. The following table provides some examples of possible comment styles.

TABLE 1

Examples of possible comment styles.

|  | Default Style #1 | Custom Style #1 | Custom Style #2 |
|---|---|---|---|
| FONT | Arial | Courier | Times New Roman |
| FONT STYLE | Bold | Regular | Italics |
| FONT SIZE | 14 | 12 | 10 |
| FONT COLOR | Blue | Red | Black |
| ANIMATION | None | Blinking | None |
| UNDERLINING | none | Single Underline | Double Underline |
| NON-TEXT | Blue Highlight | Red Outline | None |

Figure 4:
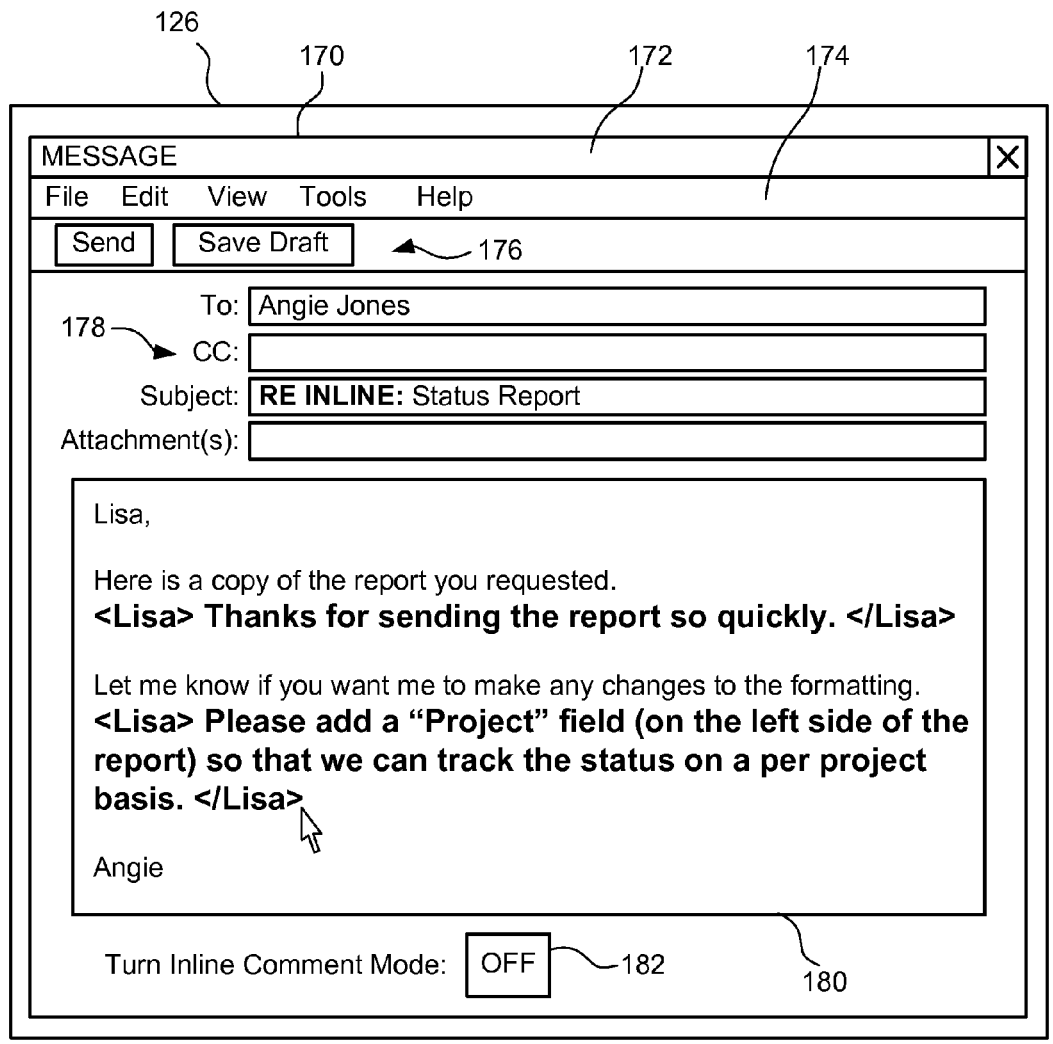
FIG. 4 depicts a schematic diagram of another embodiment of the email user interface with a reply message that includes inline comments.

FIG. 4 depicts a schematic diagram of another embodiment of the email user interface 126 with a reply message 170 that includes inline comments. The reply message 170 includes a title bar 172, a menu bar 174, and one or more action buttons 176. The title bar 172 shows a title of the reply message 170. The menu bar 174 shows possible menu selections within the reply message 170. The action buttons 176 allow the user to send the reply message 170 to another user or save a draft of the reply message 170. The reply message 170 also includes message header fields 178, message content 180, and a comment mode toggle button 182. In one embodiment, the comment mode toggle button 182 allows a user to turn on or off the inline comment mode while the user is composing the reply message 170.

In one embodiment, the subject field of the message header fields 178 uses a distinct subject line identifier (e.g., "RE: INLINE:") to identify the reply message 170 as a response with inline comments. The global preferences 136 stored in the client memory 132 may indicate whether or not to use a unique subject line identifier and, if so, what type of unique subject line identifier should be used. By using a unique and descriptive subject line identifier, as described herein, the person generating the reply message 170 may forego adding a note within the message content 180 to explain that inline comments are embedded within the copy of original content 160 from the received message 150.

In one embodiment, the message content 180 of the reply message 170 includes a copy of the original content 160 from the received message 150 (refer to FIG. 3) and comment content (shown in bold) inserted into or embedded within the copy of original content 160. The illustrated message content 180 includes two instances of comment content. The first instance of the comment content states "Thanks for sending the report so quickly." The second instance of the comment content states "Please add a 'Project' field (on the left side of the report) so that we can track the status on a per project basis." Both of these instances of comment content are visually distinguishable from the original content, for example, because the comment content is shown in a bold font style at an increased font size. Also, it should be noted that the comment content can be adjoined, inserted, or otherwise added to any location near or within the original content 160. Although the illustrated example shows the comment content embedded within the original content 160, other embodiments may facilitate adding the comment content before the original content 160, after the original content 160, or in another location relative to the original content.

Additionally, each of the instances of comment content shown in the reply message 170 is further identified by source identifiers (<Lisa> and </Lisa>). The source identifiers indicate that the content between the opening source identifier (<Lisa>) and the closing source identifier (</Lisa>) is comment content added by a user identified as Lisa. In this way, the source identifiers visually indicate a specific user (Lisa) as the source of the comment content. By using these or other types of source identifiers, it may be possible to easily distinguish between comment content from different people, for example, within an extended thread of email communications involving several different users.

In certain embodiments, the comment content is adjoined to the original content in a manner that does not change the style or formatting of the original content, except to provide sufficient space between lines to show the comment content inline with the original content. Thus, some embodiments may preserve the original content so that a user does not inadvertently change or delete the original content.

Also, in some embodiments, the inline comment mode invoked via the email client 128 formats the reply message 170 differently from other reply communications. As one example, the email client 128 may generate the reply message 170 without inserting a standard signature block that might otherwise be added to messages generated by the same user. Alternatively, the email client 128 may automatically locate the standard signature block after the copy of the original content, or at another specified location. In this way, by establishing specific rules by which the email client 128 generates a reply communication in the inline comment mode, the user can easily insert comments without having to perform various, potentially repetitive, formatting changes to the text and content layout of the reply communication.

FIG. 5 depicts a schematic diagram of one embodiment of a comment preferences interface 190 for setting the global preferences 136 and the comment style definitions 134 stored in the client memory 132 of FIG. 2. As a matter of convention, the global preferences 136 refer to settings that are not unique to a specific comment style, while the comment style definitions 134 may be unique from one comment style to another. However, the description herein of specific properties or settings as global preferences 136 does not preclude embodiments in which the properties and settings may be implemented as comment style definitions 134. Similarly, the description herein of specific properties or settings as comment style definitions 134 does not preclude embodiments in which the properties and settings may be implemented as global preferences 136. Thus, any of the properties or settings described herein may be implemented as global preferences 136 and/or comment style definitions 134.

In the illustrated embodiment, the comment preferences interface 190 includes various selection fields so that a user can set the global preferences 136 and/or the comment style definitions 134. For example, a user may select to use source identifiers, as shown in FIG. 4. Also, the user may select to use a specific type of source identifiers, including user-defined source identifiers. As another example, the user may select to use a subject line identifier, as shown in FIG. 4. Also, the user may select to use a specific type of subject line identifier, including a user-defined subject line identifier.

As another example, the user may select to preserve the formatting of the original content 160 of the received message 150. Additionally, the user may select to generate the reply message 170 without using a standard signature block that might otherwise be included in the reply communication. Other embodiments may facilitate selection of other settings and preferences.

In some embodiments, the user also may establish one or more customizable rules which apply to the generation of the reply message 170, the selection of a particular comment style, and so forth. As examples, the user may select default comment styles for use depending on whether or not a comment style conflicts with the text style of the original message content and/or the standard response content. Also, the user may set customized rules for preferences relating to particular users. With the benefit of this disclosure, it should be appreciated that a variety of different rules may be established to customize the global preferences 136 and/or the comment style definitions 134 any number of ways.

The illustrated user preferences interface 190 also includes fields to allow a user to define one or more of the comment style definitions 134. Each comment style definition 134 may include one or more text properties (on non-text properties) that are intended to uniquely identify the comment content from the original content and/or the standard response content. Some examples of different comment styles are provided in the table shown above.

Figure 6:
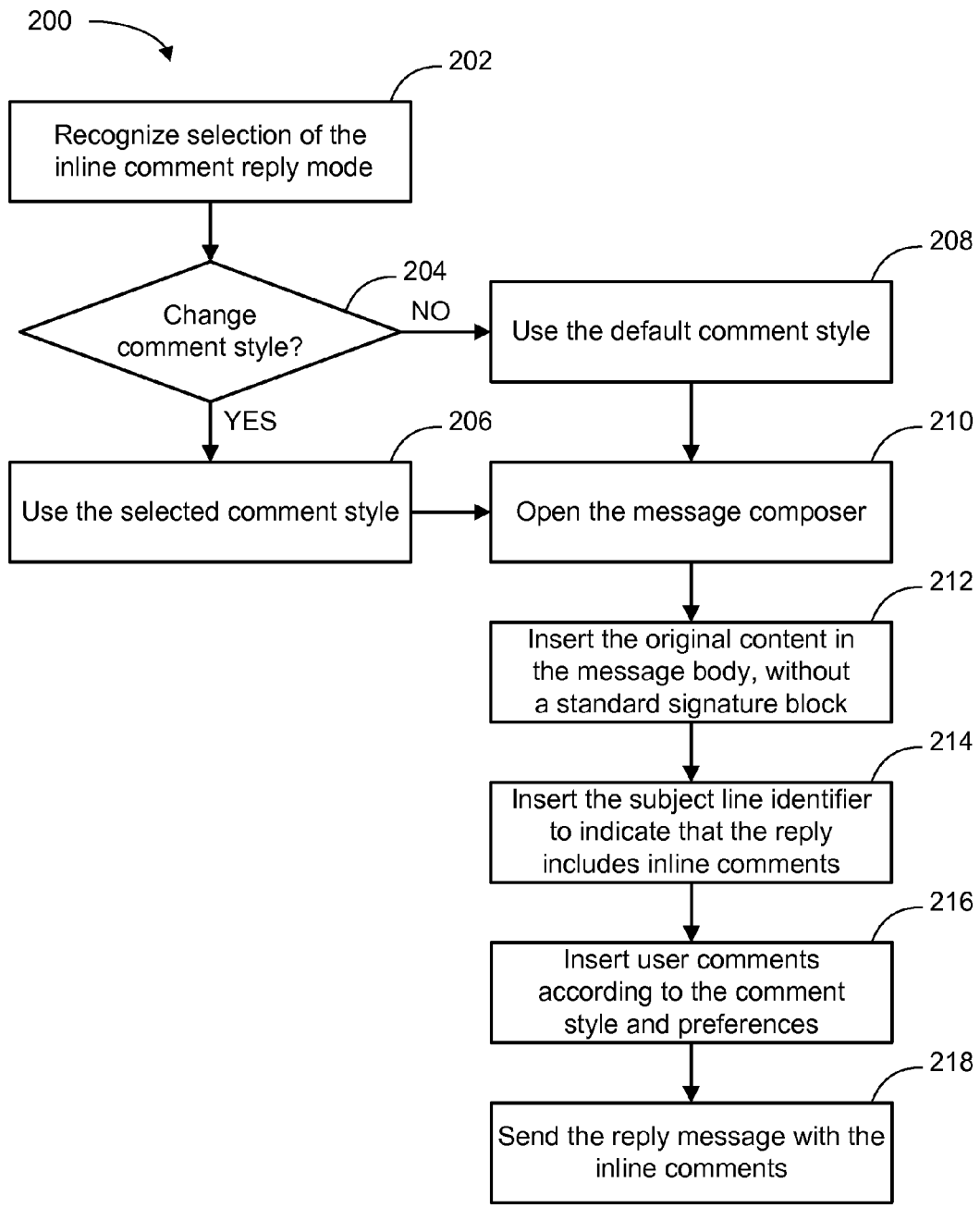
FIG. 6 depicts a flowchart diagram of one embodiment of a method for using the email client of FIG. 2 in an inline comment mode.

FIG. 6 depicts a flowchart diagram of one embodiment of a method 200 for using the email client 120 of FIG. 2 in an inline comment mode. Although the method 200 is described in conjunction with the email client 120 of FIG. 2 and the email system 100 of FIG. 1, embodiments of the method 200 may be implemented with other types of email clients and email systems.

In response to receiving an electronic communication on an electronic communication device, the email client 128 recognizes 202 a selection to respond to the electronic communication in an inline comment mode. In some embodiments, the email client 128 also determines 204 whether a default comment style or another selected comment style will be used for the inline comments. If a comment style is selected, then the inline comment mode uses 206 the selected comment style. Otherwise, the inline comment mode uses 208 the default comment style. As explained above, the comment style may depend on the standard response style and/or the original content style.

In the illustrated method 200, the email client 128 then opens 210 the message composer 129 to generate a reply communication, which includes inserting 212 a copy of the original content 160 from the original communication. As explained above, the original content 160 may be inserted without inserting a standard signature block of the responding user. The email client 128 also inserts 214 the subject line identifier to indicate that the reply message 170 include inline comments.

The email client 128 then inserts 216 the user comments according to the selected comment style and preferences. Once the reply message 170 is fully composed, then the email client 128 sends 218 the reply message 170 with the inline comments to the indicated recipients. The depicted method 200 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain or store the program for use by or in connection with the instruction execution system, apparatus, or device. Further, the computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In a specific embodiment, the computer program product includes a computer useable storage medium to store a computer readable program that, when executed on a computer, causes the computer to implement an inline comment mode, as described herein. In one embodiment, the operations include recognizing a user selection to respond to an electronic communication in an inline comment mode. The operations also include generating a reply communication with a copy of original content from the electronic communication. The operations also include an operation adjoining comment content to the copy of original content within the reply communication according to user commands. As explained above, the comment content is uniquely identified from standard response content according to inline comment rules in effect during the inline comment mode.

In another embodiment, the operations also include displaying the electronic communication with a reply menu selection entry to respond to the electronic communication using the inline comment mode. In other embodiment, the operations also include automatically generating a subject line identifier for the reply communication to identify the reply communication as a response with inline comments. In another embodiment, the operations also include displaying an electronic communication composer for the reply communication with a reply mode selection button to selectively turn on and off the inline comment mode during generation of the reply communication. In another embodiment, the operations also include storing the inline comment rules within an electronic memory device coupled to an email client. The inline comment rules include at least one rule to specify a comment text property that indicates a visual property of the comment content. The comment text property may be a font, a font style, a font size, a font color, or another font characteristic. In another embodiment, the operations also include formatting the comment content according to a selected comment style, where each comment style defines a unique set of comment text properties.

In another embodiment, the operations also include detecting a text style of the original content from the electronic communication and automatically selecting a unique text style for the comment content. In another embodiment, the operations also include adjoining non-text comment content to the copy of original content within the reply communication and visually identifying the non-text comment content to indicate that the non-text comment content is part of the adjoined comment content. Other embodiments of the computer program product may implement fewer or more instructions according to the functionality described herein.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer useable storage medium to store a computer readable program for implementing inline comments, wherein the computer readable program, when executed on a computer, causes the computer to perform operations comprising:

recognizing a user selection to respond to an electronic communication in an inline comment mode;

generating a reply communication with a copy of content from the electronic communication;

maintaining a plurality of content styles, each of the plurality of content styles comprising at least one of a font, a font style, a font size, or a font color;

identifying at least one source of content in the electronic communication and inserting a source identifier preceding the content to identify the content as original content;

applying a first one of the plurality of content styles to the original content based on the at least one source;

selecting a second one of the plurality of content styles so that the second one of the plurality of content styles is unique with reference to the first one of the plurality of content styles;

adjoining comment content to the copy of content within the reply communication;

applying the selected one of the plurality of content styles to the comment content;

displaying an electronic communication composer for the reply communication with a reply mode selection button to selectively turn on and off the inline comment mode during generation of the reply communication; and wherein a global comment preference specifies generation of the reply communication without a standard signature line.

2. The non-transitory computer useable storage medium of claim 1, wherein the computer readable program, when executed on the computer, causes the computer to perform further operations comprising displaying the electronic communication with a reply menu selection entry to respond to the electronic communication using the inline comment mode.

3. The non-transitory computer useable storage medium of claim 2, wherein the computer readable program, when executed on the computer, causes the computer to perform further operations comprising automatically generating a subject line identifier for the reply communication to identify the reply communication as a response with inline comments.

4. The non-transitory computer useable storage medium of claim 1, wherein the computer readable program, when executed on the computer, causes the computer to perform further operations comprising storing inline comment rules within an electronic memory device coupled to an email client.

5. The non-transitory computer useable storage medium of claim 1, wherein the computer readable program, when executed on the computer, causes the computer to perform further operations comprising formatting the comment content according to a selected comment style, wherein inline comment rules define a plurality of unique comment styles, and each comment style defines a unique set of comment text properties.

6. The non-transitory computer useable storage medium of claim 1, wherein the global comment preference specifies usage of a source identifier within the reply communication, wherein the source identifier visually indicates a specific user as a source of the comment content.

7. The non-transitory computer useable storage medium of claim 1, wherein the computer readable program, when executed on the computer, causes the computer to perform further operations comprising:

detecting a text style of the original content from the electronic communication; and automatically selecting a unique text style for the comment content, wherein the unique text style has at least one comment text property that is different from the text style of the original content.

8. The non-transitory computer useable storage medium of claim 1, wherein the computer readable program, when executed on the computer, causes the computer to perform further operations comprising:

adjoining non-text comment content to the copy of original content within the reply communication; and visually identifying the non-text comment content to indicate that the non-text comment content is part of the adjoined non-text comment content.

9. A communication apparatus comprising:

a client processing unit to:

receive an electronic communication and recognize a user selection to generate a reply communication for response to the electronic communication in an inline comment mode, wherein the reply communication includes a copy of content from the electronic communication;

maintain a plurality of content styles, each of the plurality of content styles comprising at least one of a font, a font style, a font size, or a font color;

identify, via a processor, at least one source of content in the electronic communication and inserting a source identifier preceding the content to identify the content as original content;

apply a first one of the plurality of content styles to the original content based on the at least one source;

select a second one of the plurality of content styles so that the second one of the plurality of content styles is unique with reference to the first one of the plurality of content styles;

adjoin comment content to the copy of content within the reply communication;

apply the selected one of the plurality of content styles to the comment content;

display an electronic communication composer for the reply communication with a reply mode selection button to selectively turn on and off the inline comment mode during generation of the reply communication; and wherein a global comment preference specifies generation of the reply communication without a standard signature line.

10. The communication apparatus of claim 9, further comprising a display device coupled to the client processing unit, wherein the display device is configured to display the electronic communication with a reply menu selection entry to respond to the electronic communication using the inline comment mode according to the inline comment rules.

11. The communication apparatus of claim 9, wherein the client processing unit is further configured to automatically generate a subject line identifier for the reply communication to identify the reply communication as a response with inline comments according to the inline comment rules.

12. The communication apparatus of claim 9, wherein the client processing unit is further configured to automatically generate a source identifier within the reply communication, wherein the source identifier visually indicates a specific user as a source of the comment content.

13. A method comprising:

receiving an electronic communication on an electronic communication device;

recognizing a user selection to respond to the electronic communication in an inline comment mode;

generating a reply communication with a copy of content from the electronic communication;

maintaining a plurality of content styles, each of the plurality of content styles comprising at least one of a font, a font style, a font size, or a font color;

identifying at least one source of content in the electronic communication and inserting a source identifier preceding the content to identify the content as original content;

applying a first one of the plurality of content styles to the original content based on the at least one source;

selecting a second one of the plurality of content styles so that the second one of the plurality of content styles is unique with reference to the first one of the plurality of content styles;

adjoining comment content to the copy of content within the reply communication;

displaying an electronic communication composer for the reply communication with a reply mode selection button to selectively turn on and off the inline comment mode during generation of the reply communication; and wherein a global comment preference specifies generation of the reply communication without a standard signature line.

* * * * *